United States Patent Office 3,093,864
Patented June 18, 1963

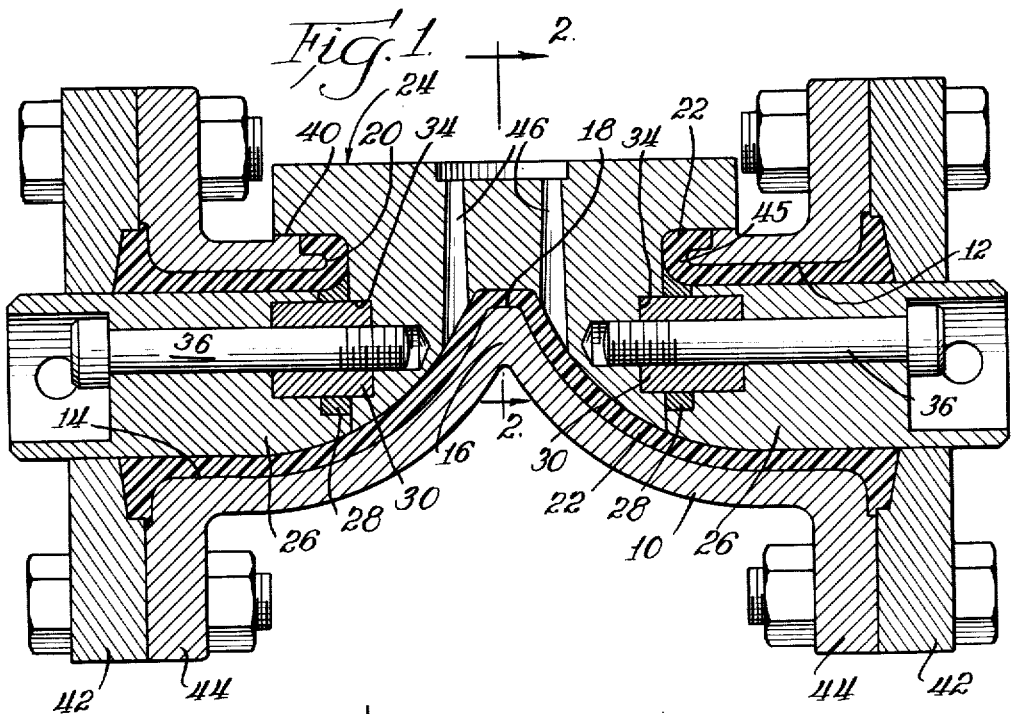
Fig. 1.
Fig. 2.
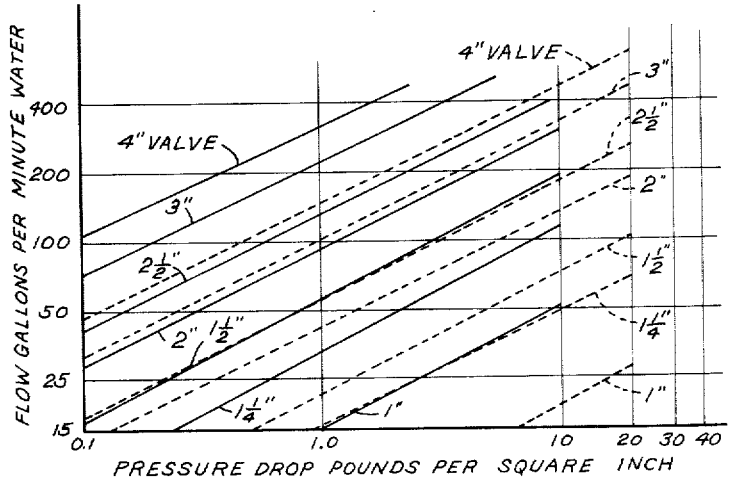
Fig. 3.
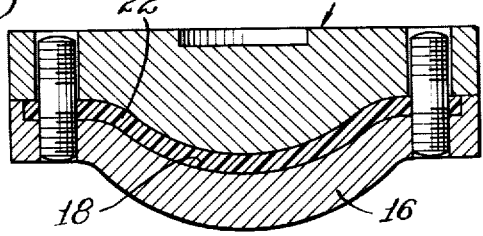
Inventors
William D. Waldron,
Donald L. McIntosh
and Robert E. Schroeder
By
Stephen J. Rudy
Att'y.

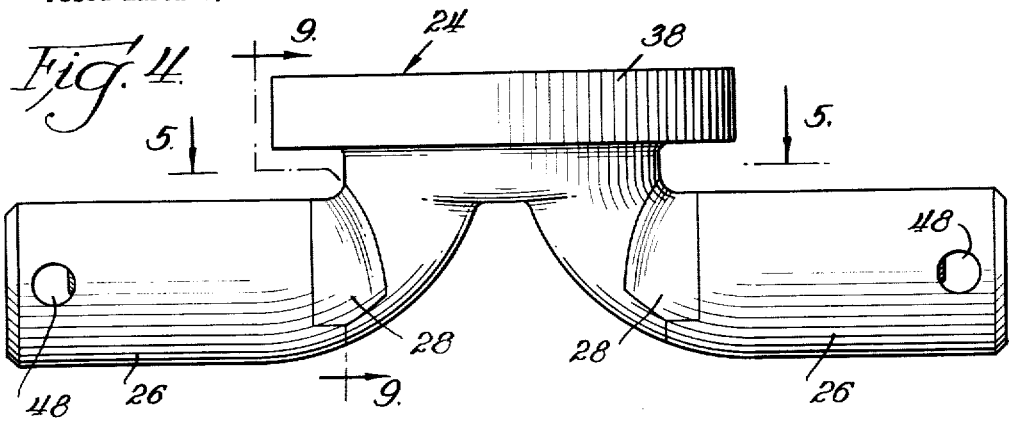
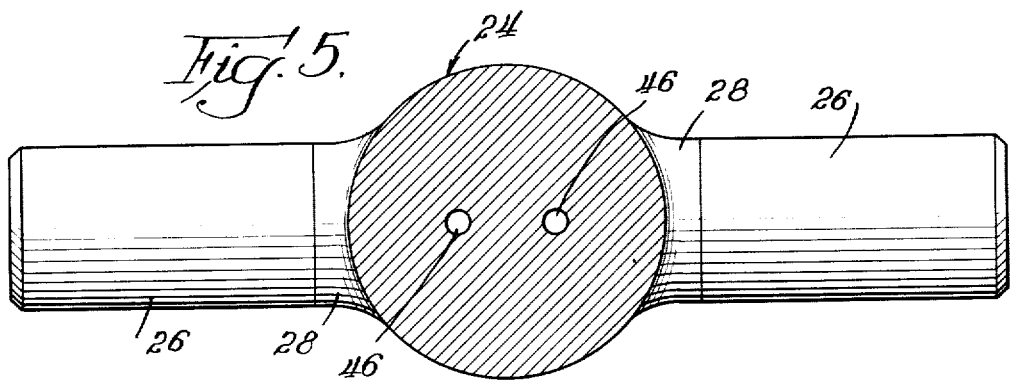
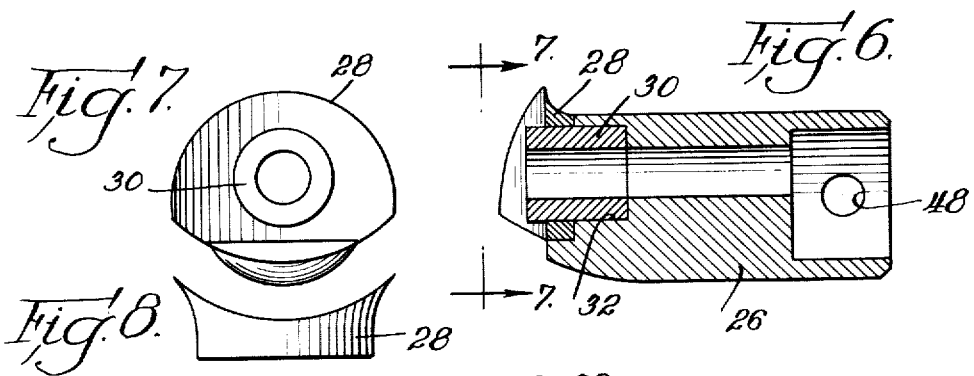

3,093,864
APPARATUS FOR LINING VALVES
WITH PLASTIC
William D. Waldron, Midland, Donald L. McIntosh, Bay City, and Robert E. Schroeder, Essexville, Mich., assignors to The Dow Chemical Company, Midland, Mich., a corporation of Delaware
Filed Mar. 7, 1960, Ser. No. 13,272
3 Claims. (Cl. 18—36)

This invention relates to an apparatus for lining valves with plastic.

In certain types of piping arrangements wherein caustic fluids are to be carried, it has been necessary and/or desirable to coat, or line the piping with various materials each adapted for resisting the corrosive action of the fluid being carried. While such lining requirements have not posed a serious problem where pipe interiors and ordinary fittings, such as elbows, etc., have been concerned, the lining of certain valves, such as diaphragm valves, has produced less than satisfactory results. One of the chief reasons for poor results has been the difficulty in producing a smooth, streamlined lining to minimize pressure drop loss caused by friction and turbulence.

The plastic lined diaphragm valve of the present invention has proven very satisfactory when used in piping carrying caustic fluids. As compared with plastic lined diaphragm valves of the prior art, the valve of the invention displays significant improvement in minimizing pressure drop loss as the fluid passes therethrough. Among the reasons the valve of the invention is able to achieve such favorable operational characteristics, is because the inner shoulders are curved to provide an overall streamlining, which was not realized in such valves of the prior art. Such streamlining is made possible by the method of the invention, which includes the use of a unique mandrel assembly, easily positioned in the valve in readiness for the valve lining operation.

The object of the invention is to provide a unique mandrel assembly which may be conveniently utilized in the plastic lining of a diaphragm type valve.

Other objects and features of the invention will become more apparent from the following description and accompanying drawings wherein:

FIG. 1 is a vertical section view illustrating a mandrel assembly embodying the principles of the invention as arranged in the lining of a diaphragm valve;

FIG. 2 is a section view as seen along line 2—2 in FIG. 1;

FIG. 3 is a graph depicting the pressure drop vs. flow relationship of a valve lined according to the invention, in comparison with a lined valve of the prior art;

FIG. 4 is an exterior view of the mandrel assembly of FIG. 1;

FIG. 5 is a view as seen from line 5—5 in FIG. 4;

FIG. 6 is a section view of a portion of the mandrel assembly of FIG. 4;

FIG. 7 is a view generally as seen from line 7—7 in FIG. 6;

FIG. 8 is a top view of the end portion of the mandrel assembly of FIG. 6; and

FIG. 9 is a view generally as seen along line 9—9 in FIG. 4.

Referring now to the drawings and more particularly to FIGS. 1 and 2, the numeral 10 identifies a valve body forming part of a diaphragm valve of the type illustrated, for example, in the U.S. patent to H. W. Boteler, No. 2,725,211, issued November 29, 1955. The body 10 has passageways 12, 14 diametrically arranged on opposite sides of a shallow weir 16, which has a concave surface 18 forming a seat for a diaphragm (not shown), arranged for flow control of fluid between passageways 12 and 14. An opening 20, located in a plane normal to the vertical plane of the weir, is arranged for receipt of means comprising a compressor (not shown) which may be used for positional control of the diaphragm.

The object of the invention is to provide a lining 22, for covering the entire interior of the valve body as defined by the passageways 12, 14, intersecting weir portion 16, and the opening 20. Toward this end, the lining 22 is formed, or molded in the valve, which lining may be made of a polymeric formulation, such as "Saran," a trade-designation of a plastic made by The Dow Chemical Company. It is to be understood, of course, that other lining material may be used depending upon the type of fluid the valve will be handling and against which corrosion protection is desired. The comparative effectiveness of the valve lining of the invention relative to reduction in pressure drop loss, is illustrated in the graph of FIG. 3. The solid line curves represent values of pressure drop vs. liquid flow, obtained for the valve sizes indicated when lined according to the method of the invention, while the broken line curves show comparable data obtained with valves lined according to another method, more typical of that of prior art valve lining methods. Obviously, the superior operating characteristics of the lined valves of the invention, demonstrate a real improvement in the art.

To produce the lining 22, a unique mandrel arrangement is used which consists of a center section, or weir mandrel 24, of generally cylindrical shape, and a pair of cylindrical members or ears 26, each of which includes a contour insert 28, and a bushing 30. Each bushing 30 fits into a bore 32 formed at the inner end of its associated ear 26, and projects therefrom a slight distance for engagement with a bore 34 formed in the weir mandrel 24. The contour inserts 28 are supported upon a respective bushing 30, and are formed so as to provide a smooth transition region between the ears and weir mandrel whereby the valve lining will have a streamlined surface. Bolt means 36 extend through each ear and engage the weir mandrel 24. The latter, when in bolt engaged position, has a flange portion 38, which seats upon a top surface 40 of the valve body 10. Plate means 42, secured to flange portions 44 of the valve body 10, are adapted to positionally support the ears 26, when the bolt means 36 are in position. The mandrel arrangement allows attainment of curved plastic lining shoulders 45 provided by the contour inserts 28, while still allowing removal of the mandrel, which has not been possible heretofore with mandrels of the prior art. It will be seen that in removing the ears 26 after a lining operation, the bushings 30 are pulled out of supporting engagement of contour inserts 28, whereupon the latter may be easily removed from the valve body without damage to the curved shoulders formed thereby.

As best seen in FIG. 1, when the weir mandrel 24 and ears 26 are positioned in the valve body 10 in readiness for a valve lining operation, a generally uniform space will be provided between the weir mandrel and ears, and the inner surface of the valve body. Valve lining material may be injected into said space via holes 46 formed in the weir mandrel. While the space may be made any thickness desired, a lining thickness of between ⅜₁₆" to ¼", when using "Saran," has been found quite satisfactory for use in handling many caustic solutions. Holes 48 are formed in the ears 26 toward the outer ends thereof, which may be used for alignment purposes as well as for extracting the ears from the lined valve.

From the foregoing it will be seen that the method of the invention may be used to line a diaphragm valve to give a smooth and streamlined interior which greatly enhances valve operating characteristic, especially in the manner in which pressure drop loss is reduced. The mandrel arrangement may be easily positioned and removed, and will withstand high molding pressures without being dislodged or shifted, thus providing valve lining of uniform thickness.

In copending application Serial No. 143,517, filed Sepember 29, 1961, are claims to a diaphragm valve having a lining formed in accordance with the principles of the invention disclosed herein.

The foregoing decription has been given in detail without thought of limitation since the inventive principles involved are capable of assuming other forms without departing from the spirit of the invention or the scope of the following claims.

What is claimed is:

1. A mandrel assembly for lining the body of a diaphragm valve having a pair of diametrically arranged passageways disposed on opposite sides of a shallow weir and an opening located in a plane normal to the vertical plane of the weir, which mandrel assembly comprises a weir mandrel adapted for positioning in said opening in spaced relation thereto, a pair of ears adapted for positioning in said passageways in spaced relation thereto and in interconnected relation with the weir mandrel, and a contour insert supported upon each ear and being formed to provide a curved shoulder in a region of transition between the weir mandrel and each ear.

2. A mandrel assembly for lining the body of a diaphragm valve having a pair of diametrically arranged passageways disposed on opposite sides of a shallow weir and an opening located in a plane normal to the vertical plane of the weir, which mandrel assembly comprises a weir mandrel adapted for positioning in said opening in spaced relation thereto, a pair of ears adapted for positioning in said passageways in spaced relation thereto, a bushing supported in each ear and arranged for extension into bores formed in the weir mandrel, and a contour insert supported upon each bushing and being interposed between the weir mandrel and an ear to provide a curved shoulder in a region of transition between the weir mandrel and each ear.

3. A mandrel assembly for lining the body of a diaphragm valve having a pair of diametrically arranged passageways disposed on opposite sides of a shallow weir and an opening located in a plane normal to the vertical plane of the weir, which mandrel assembly comprises a weir mandrel for positioning in said opening and in spaced relation thereto, said weir mandrel being formed with plastic lining material injecting holes, a pair of ears for positioning in said passageways in spaced relation thereto, a bushing supported in each ear and arranged for extension into bores formed in the weir mandrel, a contour insert supported upon each bushing and being interposed between the weir mandrel and an ear to provide a curved shoulder in a region of transition between the weir mandrel and each ear, and a bolt means extending through each ear for securing said ear to the weir mandrel.

References Cited in the file of this patent

UNITED STATES PATENTS

| | | |
|---|---|---|
| 1,992,043 | Saunders | Feb. 19, 1935 |
| 2,054,340 | Saunders | Sept. 14, 1936 |
| 2,222,755 | Watson | Nov. 26, 1940 |
| 2,454,160 | Green | Nov. 16, 1948 |
| 2,681,494 | Weber | June 22, 1954 |
| 2,697,010 | Hirschmugl | Dec. 14, 1954 |
| 2,728,127 | Armstrong | Dec. 27, 1955 |
| 2,730,003 | Loney | Jan. 10, 1956 |
| 2,949,635 | Chiero | Aug. 23, 1960 |
| 2,971,225 | Woodruff et al. | Feb. 14, 1961 |

FOREIGN PATENTS

| | | |
|---|---|---|
| 492,370 | Canada | Apr. 28, 1953 |

Disclaimer 3,093,864.—*William D. Waldron*, Midland, *Donald L. McIntosh*, Bay City, and *Robert E. Schroeder*, Essexville, Mich. APPARATUS FOR LINING VALVES WITH PLASTIC. Patent dated June 18, 1963. Disclaimer filed Nov. 27, 1970, by the assignee, *The Dow Chemical Company*.

Hereby enters this disclaimer to claims 1, 2 and 3 of said patent.

[*Official Gazette March 2, 1971.*]